United States Patent [19]
Kipnes

[11] Patent Number: 5,383,286
[45] Date of Patent: Jan. 24, 1995

[54] HAND HELD DEVICE FOR MEASURING SCREW THREADS BY THE THREE-WIRE METHOD

[76] Inventor: Hyman J. Kipnes, 54 Canterbury Dr., Hauppauge, N.Y. 11788

[21] Appl. No.: 120,174

[22] Filed: Sep. 10, 1993

Related U.S. Application Data

[63] Continuation-in-part of Ser. No. 972,248, Nov. 5, 1992, Pat. No. 5,317,809.

[51] Int. Cl.⁶ .......................... G01B 3/18; G01B 5/16
[52] U.S. Cl. ........................................ 33/829; 33/199 R
[58] Field of Search ................. 33/199 R, 199 B, 815, 33/828, 829, 831

[56] References Cited

U.S. PATENT DOCUMENTS

| | | | |
|---|---|---|---|
| 2,431,021 | 11/1947 | Bourdelais . | |
| 2,692,438 | 10/1951 | Schneider . | |
| 2,805,483 | 9/1957 | Zelnick | 33/815 |
| 2,822,624 | 2/1958 | Klink | 33/199 R |
| 2,906,029 | 9/1959 | Croshier . | |
| 2,939,220 | 6/1960 | Croshier . | |
| 2,962,817 | 12/1960 | Varney . | |
| 3,068,582 | 12/1962 | Crossley | 33/199 R |
| 3,812,591 | 5/1974 | Michaud | 33/199 R |
| 4,480,388 | 11/1984 | O'Brien | 33/199 R |
| 4,553,337 | 11/1985 | Brewster | 33/199 R |
| 4,590,678 | 5/1986 | Arredondo | 33/199 R |
| 4,777,361 | 10/1988 | Affa | 250/239 |
| 4,821,422 | 4/1989 | Porter | 33/199 R |
| 4,939,845 | 7/1990 | Porter | 33/199 R |
| 4,947,555 | 8/1990 | Allen | 33/199 R |
| 5,175,935 | 1/1993 | Welter | 33/199 R |

FOREIGN PATENT DOCUMENTS

| | | | |
|---|---|---|---|
| 0555830 | 9/1943 | United Kingdom | 33/829 |
| 583385 | 1/1946 | United Kingdom | 33/199 R |

OTHER PUBLICATIONS

"The Mahr Gage Calibration Center" Advertisement, Mahr Gage Co., 274 Lafayette Street, New York, N.Y. 10012 (no date).
"Mahr Dimensional Metrology, Measuring Instruments, Measuring Machines, Gauges", Catalog, Mahr Gage Co., N.Y., N.Y. pp. 45, 49 23. (no date).
Machinery Handbook, Measuring Screw Threads, pp. 1668–1687. (no date).
US Dept. of Commerce, National Bureau of Standards, Handbook H28 Screw-Thread Standards for Federal Services, Appendix A4, 1969.

*Primary Examiner*—Alvin Wirthlin
*Attorney, Agent, or Firm*—Alfred M. Walker

[57] ABSTRACT

A device for holding wires for measuring screw threads by the three wire method with a micrometer includes a body portion and a plurality of wire holder ears in a vertical position, the wire holding ears being responsive to rotational movement and the wire holder ears being limited in the rotational movement by weighted lower base portions provided on the bottom of the wire holder ears. The wire holders are further limiting in movement by a movement limiting attachment engageable with an anvil of the micrometer, such as in a collar or U-shaped track have a defined recess for limiting the movement of the wire holders within the confines of the recess. To further stabilize the rotating spindle of the micrometer within a bore of the wire holders, the wire holders are further provided with C-shaped spring clamp engageable within a further bore encircling the bore through which the spindle extends.

14 Claims, 3 Drawing Sheets

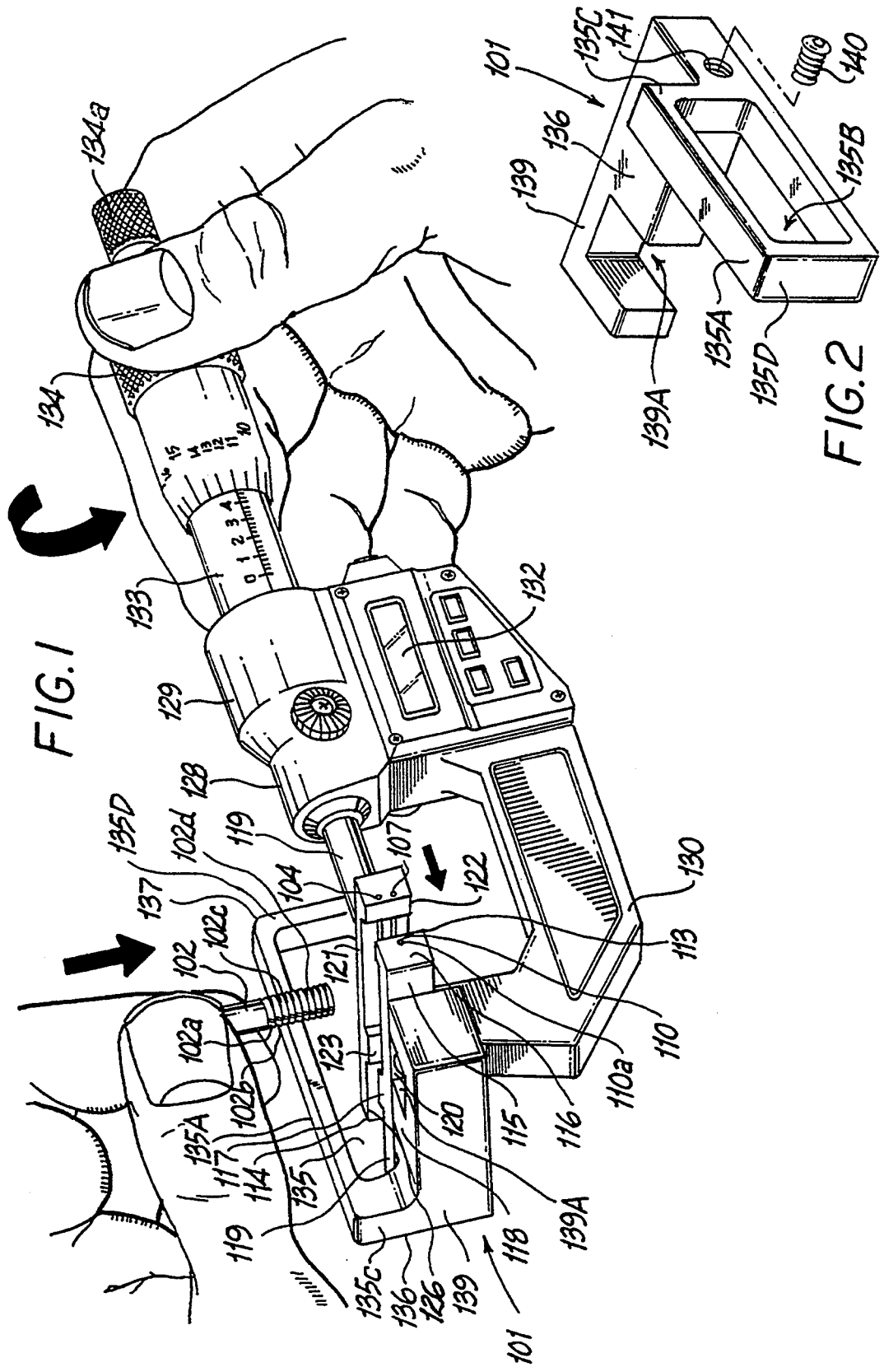

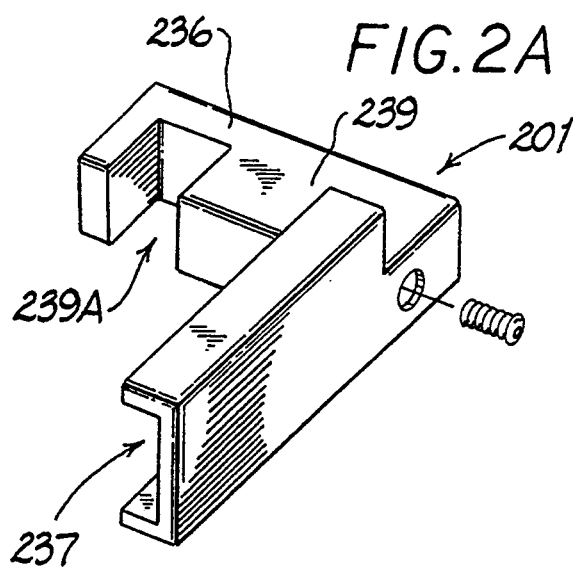
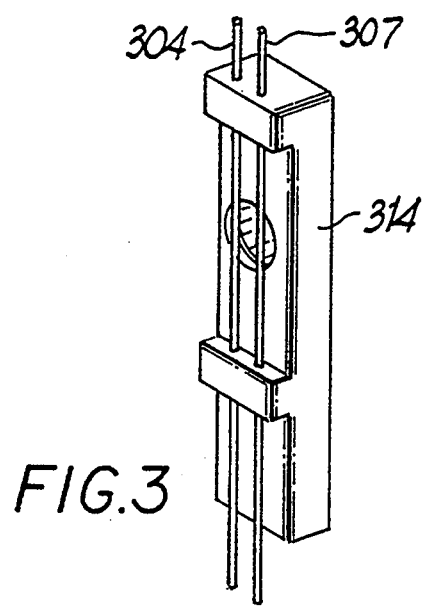
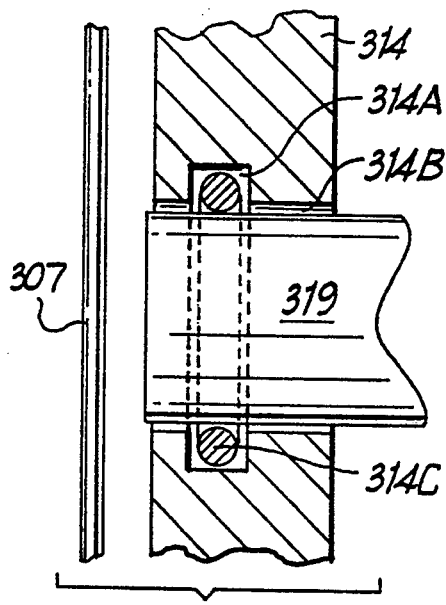
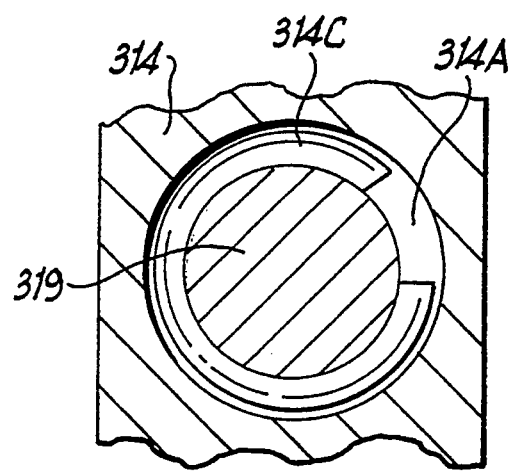
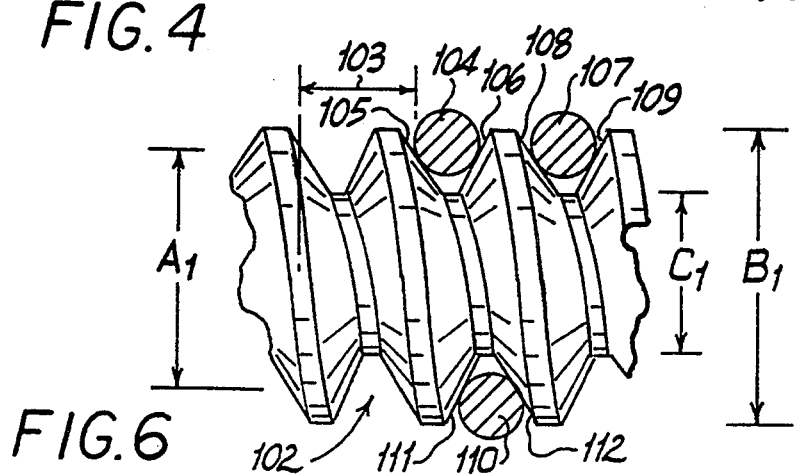

HAND HELD DEVICE FOR MEASURING SCREW THREADS BY THE THREE-WIRE METHOD

This application is a continuation-in-part of application Ser. No. 07/972,248, filed Nov. 5, 1992, Pat. No. 5,317,809.

FIELD OF THE INVENTION

This invention relates to an apparatus for measuring the pitch diameter of screw threads, by utilizing the traditional three-wire method, in which the measuring wires are optimally held in place within the flanks of screw threads during measurement, without shifting and deviation from a preferred orientation of the measuring wires within the respective screw threads.

BACKGROUND ON THE INVENTION

In order to provide for accurate mating of outside threads to fasteners with inside threads, outside screw threads must be meticulously measured for uniformity. The "pitch" of a screw thread is the distance between a point on a screw thread and the corresponding point on the adjacent thread in a line parallel with the axis of the screw. Moreover, the "pitch diameter" of a screw is the diameter of a screw measured from a midpoint on the flank surface of a screw thread through the screw to an opposite midpoint on a flank of the screw thread of the screw, in a direction perpendicular to the axis of the screw. In other words, on a straight thread, the pitch diameter is the diameter of the cylinder whose surface passes through the thread profiles at such points as to make the widths of thread groove and thread ridge equal.

Various methods have been provided for measuring screw threads by using the aforementioned three wires for measuring the pitch diameter of the screw threads. Screw threads are measured in accordance with United States Department of Commerce, National Bureau of Standards HANDBOOK H28, entitled "Screw-Thread Standards For Federal Services-Appendix For Methods of Wire Measurement of Pitch Diameter of 60 degree Threads". According to the federal standards, the measurement of the pitch diameter, that is the distance between the centers of two adjacent screw threads, the measurement must be accurate with no room for movement of the wires, which wires are placed upon the flank surfaces within the screw threads for the purpose of measuring the pitch diameter.

It is further noted that while the aforementioned appendix applies to 60 degree threads, other angled threads are similarly measured.

In a typical use, one hardened steel longitudinally extending center wire is placed upon the flank surfaces within the tapered walls of the screw thread. On the opposite side of the screw thread to this center wire are two offset wires placed upon the flank surfaces in the corresponding tapered walls between the threads of the screw.

Typically, the hardened steel longitudinally extending cylinder wires are placed in the thread groove. The two offset wires are placed on one side of the screw and the one single center wire is placed on the opposite side.

In the prior art, various holders are described for holding the wires within a micrometer anvil so that one holder, such as that having the two offset wires, is advanced towards the opposite holder with the center wire.

As noted above, the wires should be placed such that the outside circumference of the cylindrical wire touches exactly the mid slope of the flank of the thread of a given pitch. However, in the prior art, in order to hold the wires exactly in the proper measuring position, two movable holding members, such as rubber bands or springs, are typically used to hold the wires still in place during the measurement of the screw threads. However, use of any "movable" holders, such as rubber bands or springs, is not allowed in government standards as well as in standard engineering texts, such as the *Machinery Handbook*, which notes that the three measuring wires should be firmly held in place during measurement.

When standard micrometers are used, however, often the use of the three-wire method for measuring screw threads is an unwieldy manual process, which reduces the repeatability of measurement, in which the user must hold the micrometer in one hand, as well as the three wires, while the other hand moves the handle, while moving the anvils of the micrometer, to position the double offset wires and the single center wire. This movement enables the wires to make contact with the thread groove.

Various devices have been patented to attempt to use the three-wire method for measuring screw threads. Among these are U.S. Pat. Nos. 2,431,021 of Bourdelais, 2,939,220 of Croshier, 2,822,624 of Klink, 2,692,438 of Schneider, 2,906,029 also of Croshier, 2,962,817 of Varney, 3,812,591 of Michaud, 4,480,388 of O'Brien, 4,553,337 of Brewster, 4,590,678 of Arredondo, 4,777,361 of Affa, 4,821,422 of Porter, 4,939,845 also of Porter, 4,947,555 of Allen and 5,175,935 of Welter.

The Bourdelais '021, Croshier '220, Klink '624, Schneider '438, Croshier '029, Barney '817, O'Brien '388, Porter '422, Porter '845 and Welter '935 patents generally disclose wire holding attachments for the three-wire method of measuring pitch diameters of screw threads. However, some of the known devices have significant disadvantages, such as the fact that the devices cannot hold the three wires firmly in place, within the screw threads, because of the use of springs which, as the springs are compressed smaller, results in the likelihood that there is increasing pressure upon the three wires, which may result in the possibility of the dislodging of the wires.

Such use of springs is disclosed in the Croshier '220 and '029 patents. In Croshier '220, two off-set wires, which are held in place against the screw threads, are movable, which can cause inaccuracies of the measurements. Likewise, in Croshier '029, the wires are held apart by a hub, so that the wire pins float, and are not locked in a solid position against the flank surfaces within the screw threads.

Furthermore, in Croshier '220, the holes holding the wires are larger than the diameter of the cylindrical wires, which may cause the wires to shift while conforming to the flank surfaces of the screw threads. The shifting may result in inaccurate measurements and is therefore contraindicated according to the aforementioned Federal standards and engineering handbooks.

Moreover, O'Brien '388 requires a flexible holder, such as a rubber band, which is not permitted under the federal *Handbook H28*.

Many of the prior art patents have complicated moving parts and springs, which do not provide for accurate measurement of screw threads. Another problem with the prior art devices, such as O'Brien '388, is that they do not have a positive means for the wires to adjust to the lead angle of the threads being measured.

The Michaud '591 Patent describes a ridged gage tip and the Brewster '337 Patent discloses the use of a control screw thread to measure a screw thread, but it has the disadvantage that it may move too much in place for accurate measurement. The Allen '555 Patent describes rotating measuring balls instead of longitudinally extending straight wires, which makes it difficult to locate the exact center of the screw diameter. Affa '361 describes a housing with a measuring scanning unit, and Arredondo '678 discloses use of a single wire instead of three wires to measure threads. Moreover, since the outer side of the screw thread opposite to the single wire is held against a flat surface, the measurement is inaccurate because if the outside diameter of a screw thread varies, the pitch diameter measurement will be inaccurate.

In an unpatented prior art publication, there is shown a three wire measuring system in the catalog of the Mahr Gage Co., Inc. of 274 Lafayette St., New York, N.Y., which defines a calibration device which includes a pair of holder ear pieces for holding the respective center wire and two off-set wires against the screw threads at opposite sides of the screw threads being measured. In the Mahr system, the two sets of wires move in place as the non-rotating spindle of a micrometer is advanced towards the other wire holder with the single center wire.

The disadvantage of the Mahr device is that the measuring wires are advanced towards each other in a horizontal orientation, thereby resulting in the possibility of inaccuracies, because of the effect of gravity upon the horizontally oriented holder ear pieces for the wires. In the Mahr device the wires are solely held in place against gravity in a horizontal position by the wire holder ears. Moreover, in the Mahr device the wires are held in place in one location within the holder ear pieces, so that if a particular wire tends to wear out where it is being used to measure screw thread pitch diameter on a frequent basis, the particular wire cannot be moved in an axial direction so as to expose a further portion of the wire, which is not worn, out to the screw threads.

OBJECTS OF THE INVENTION

Therefore, it is an object of the present invention to provide an apparatus for the three-wire measurement of the pitch diameter of screw threads using a standard hand-held micrometer, in which the improvement lies in the generally vertical orientation of the wires, within a restricted rotational field, to keep the wires from spinning 360 degrees, and thereby causing unwieldy and inaccurate measurements.

A further object of the present invention to provide an apparatus for measuring the pitch diameter of screw threads with the three-wire method, in which the wires are limited in their rotation.

A further object of present inventions is to provide an apparatus for automatically aligning up wires of a three-wire method for measuring the pitch diameter of screw threads, thereby insuring the correct contact with the helix angle of the thread.

It is a further object of the present invention to provide for a means for holding the screw with the screw threads being measured in a horizontal position, to accommodate the vertically oriented three measuring wires.

It is a further object of the present invention to provide a means for moving and repositioning the wires within the holders in between uses.

It is a further object of the present invention to stabilize a holder for the measuring wires upon a rotating spindle of a micrometer.

It is a further object of the present invention to improve over the disadvantages of the prior art.

SUMMARY OF THE INVENTION

In keeping with the foregoing objects and others which may come apparent, there is provided an apparatus for accurately aligning the wires for efficiently measuring the pitch diameter of the screw threads, wherein the wires are limited in their rotation away from a vertical axis of orientation, as noted in the appended drawings.

The hand held apparatus that positions the wire holders and the three measuring wires in correct alignment for engaging the exact midslope of the screw thread flank to be measured is attached to the micrometer, allowing one hand to hold the measuring device while the other hand positions the screw thread for measurement.

Holders for the measuring wires are fitted on the spindle and anvil of a measuring micrometer, allowing a single center wire and an opposite pair of double wires to be accurately positioned in relation to each other. This positioning of the three measuring wires places the wires in correct alignment for engaging the exact midslope of the screw thread flank being measured.

The single center wire and the opposite pair of double wires are secured in place, within the rectangular holders by set screws, or other fastening means, while being held within grooves, or holes, within upper and lower horizontally extending cantilevered portions of the holders. The wires extend longitudinally longer than the vertically extending height of the holder, so that the wires can be adjusted up or down within the holders when a portion of the wires becomes worn through use. This feature extends the useful life of the wires.

It is preferable that the measuring wires be oriented vertically to minimize the effects of gravity upon the static position of the measuring wires. A horizontally extending measuring wire may be inherently unstable, because gravity may tend to cause a "see saw" type of movement. To insure the preferred generally vertical orientation of the wires, the wire holders are weighted at the bottom and ride within a limited rotational field within a restrained area, such as a U-shaped track. The holders are limited in their rotational movement by the U-shaped track, which assists in aligning the wires in the thread grooves. Therefore, the wires are maintained in an ideal position for engaging any lead angle of a thread to be measured.

BRIEF DESCRIPTION OF DRAWINGS

A more complete understanding of this invention can be obtained from the following detailed description of the drawings, in which, when read in conjunction with the accompanying drawings, similar elements are referred to and indicated by referenced numerals.

FIG. 1 is a perspective view, viewed from above, of the rotational movement limiting device of the present invention.

FIG. 2 is a perspective view of the rotational movement limiting device thereof.

FIG. 2A is a perspective view of an alternate rotational movement limiting device of the present invention.

FIG. 3 is a perspective view of the wire holder portion of the rotational movement limiting device of the present invention, as shown in FIG. 1.

FIG. 4 is a side elevation view in partial cross section of the rotational movement limiting device of the present invention as shown in FIG. 1.

FIG. 5 is a front elevational view of the rotational movement limiting device of the present invention as shown in FIG. 1.

FIG. 6 is a close up view of a typical screw with the pitch diameter being measured by the present invention.

DETAILED DESCRIPTION OF PREFERRED EMBODIMENT

Figure 1A:
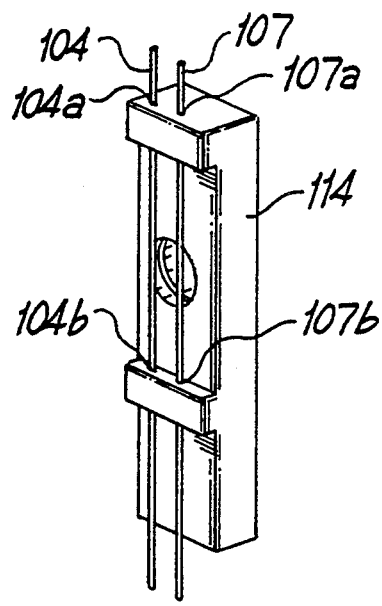
FIG. 1A is a perspective view of the wire holder portion of the device.
Figure 1B:
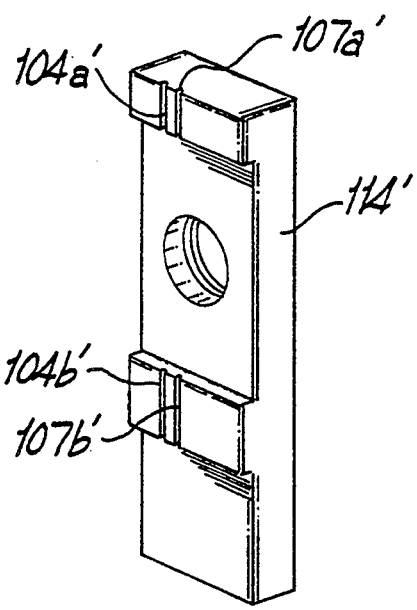
FIG. 1B is a perspective view of an alternate wire holder portion of the device.
Figure 1C:
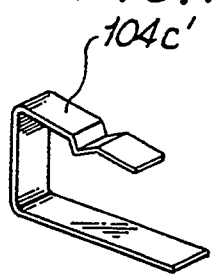
FIG. 1C is a perspective view of a retaining spring clip for the alternate wire holder in FIG. 1B.
Figure 1D:
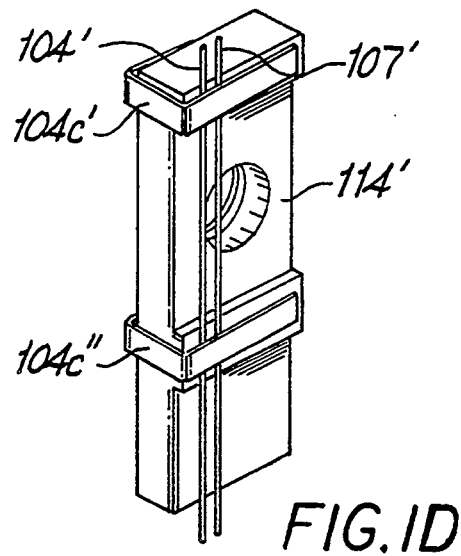
FIG. 1D is a perspective view of the holder as in FIG. 1B assembled with the retaining spring clip of FIG. 1C.
Figure 1E:
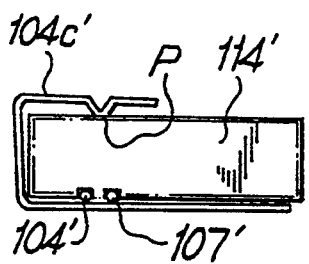
FIG. 1E is a top view of the wire holder and clip as in FIG. 1D.

The preferred embodiment of the present invention is shown and described by way of example in FIGS. 1-5. In the drawing FIGS. 1-5 there is provided a rotational limiting device 101 with an attachment 136 for attaching to a conventional micrometer for measuring the pitch diameter of screw threads, with the three-wire method, of a screw 102 having threads 102a, 102b, 102c, 102d respectively, wherein the pitch diameter is measured by pair of off-set wires 104 and 107, which are held against adjacent screw threads opposite to a single center wire 110.

As shown in FIG. 6, reference numeral 103 designates the "pitch", of the linear distance from one screw thread to another.

As also shown in FIG. 6, the pitch diameter being measured of the threads of screw 102 is designated as A1. The major diameter of the threads is designated as B1, and the minor diameter of the threads is designated as C1.

Attachment 136 attaches to a micrometer, and wire 104 is held within the tapered wire contacting flank walls 105 and 106 of screw 102. Wire 107 is held in place within the tapered contacting flank walls 108 and 109 of the screw 102. The single center wire 110 is held in place within the tapered walls contacting flank walls 111 and 112 of the screw 102.

Attachment 136 enables single center wire 110 to be held in place within wire holder 113 against the threads 102a, 102b, 102c, and 102d etc. of screw 102. As shown in FIG. 1A, offset double wires 104 and 107 are held in place within holes 104a, 107a, 104b, 107b within double wire holder 114.

Since the double wires 104 and 107, and single center wire 110, must engage the interior flank surfaces of the screw threads 102a, 102b, 102c or 102d, etc. in a position parallel to the lead angle of the screw threads 102a, 102b, 102c or 102d, etc., the wires 104, 107, 110 are engaged perpendicular to the longitudinal axis of screw 102.

Wires 104, 107 and 110 are first placed against the appropriate flanks of the screw threads being measured as holder 114 is moved by spindle 119 of micrometer 129. As shown in FIG. 1, the wires 104, 107 and 110 are held firmly in a vertical orientation against the screw 102. If oriented vertically, the wires tend to stay still by the force of gravity. If they are held at an angle or horizontally, the force of gravity acts to subject the wires 104, 107 or 110 to movement, which is contraindicated when precisely measuring the pitch diameter of screw threads.

As shown in FIG. 1, single center wire 110 is held in place vertically against the appropriate flanks of the screw threads on an opposite side of the screw 102 within single wire holder 113, which single wire holder 113 includes main portion 115, having an upper cantilevered ledge extension portion 116 and a lower cantilevered ledge portion 117, extending in spaced relationship away from each other, and away from main portion 115, so that single center wire 110 is held in place in hole 110a of upper cantilevered portion 116 and a correspondingly hole (not shown) within lower cantilevered portion 117.

A lower weighted tail portion 119 is located below cantilevered portion 117 to hold the wire holder 113 in a vertical orientation, such that weighted portion 119 is retracted down.

Wire holder 113 is held in place against anvil portion 130 of micrometer 129 abutting rear portion 120 of wire holder 113.

Conversely, wire holder 114 for wires 104 and 107 includes a main portion 121, above which is situated upper cantilevered portion 122, and below which is situated lower cantilevered portion 123, such that cantilevered portions 122 and 123 are positioned in spaced relationship away from each other to permit the holding of offset wires 104 and 107 parallel in place for measuring the screw threads of screw 102. A weighted tail portion 126 is disposed below the lower cantilevered portion 123 to facilitate the vertical orientation of the wire holder 114, as it is weighted down by lower tail portion 126.

The wire holder 114 for offset wires 104 and 107 is firmly held in place by an engaging spindle portion 119 rotatable within collar portion 128 of micrometer 129, having indicating display member 132 with indicia, by rotational movement of spindle 119 connected to micrometer rod 133, which rod 133 is movable by rotation of handle 134 for tightening of double wire holder 114, disposed to spindle 119, against screw Handle may optionally include a torque control 134a disposed to handle 134.

Alternately, as shown in FIGS. 1B-1F, double wires 104' and 107' may be held in place within open grooves 104a', 107a' by clips 104c', 104c'', which clips 104c' and 104c'' are notched to provide contact against holder 114' at a point opposite to the double wires 104' and 107' within grooved holder 114' to maintain pressure on both wires at the same time.

Spring clip 104c' and 104c'' retain wires 104' and 107' firmly within the grooves of grooved holder 114'. The clips 104c' and 104c'' accommodate different wires of varying diameters and dimensions. As shown in FIG. 3E, pressure point P of the spring clip holder 104c'' for the double wire holder 114' is on the opposite side of clip 104c' from wires 104' and 107' and lies in the direct center line between wires 104' and 107'. This assures spring clip holder 104c' creates equal pressure against both wires 104' and 107'.

Figure 1G:
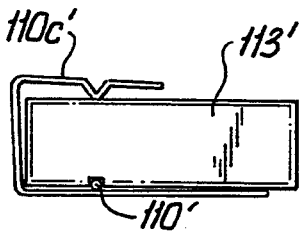
FIG. 1G is a top plan view of an alternate wire holder ear for one wire.
Figure 1F:
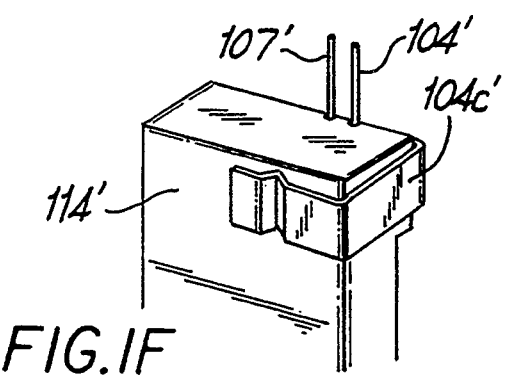
FIG. 1F is a close up view of the wire holder and clip as in FIG. 1D.

As shown in FIG. 1G, the single wire 110, the pressure point P of the spring clip holder is on the opposite side, opposite single wire 110' and it lies in the direct center line of the single wire 110'. Similarly, single center wire 110' is held in place within holes within single wire holder 113', or within grooves (not shown) and a clip 110c' similar to those shown with holder 114'.

Preferably, the rotation of handle 134 controls a uniform force applied of wires 104, 107 and 110 against screw threads 102a, 102b, 102c, 102d, etc. by a torque control built into handle 134 of the micrometer 129.

As shown in FIGS. 1 and 2, the device 101 includes elongated anvil engaging attachment 136, having a slotted block portion 139, with a slot 139A for engaging the anvil 130 of a micrometer 129 and further having a rotational limiting collar track 137 attached to slotted block portion 139, which rotational limiting collar track 137 is held in place for limiting the movement of holder 113 having wire 110 and holder 114 having wires 104 and 107 for measuring the pitch diameter of screw threads of screw 102. The device 101 is fastened to anvil 130 of micrometer 129 by a fastening means 140, such as a set screw, threadable within a threaded bore 141 within block 139 of anvil engaging attachment 136; the set screw 140 being engageable against anvil 130 of micrometer 129.

A recess 135 is indented within the confines of rotational limiting collar track 137, and recess 135 is defined by vertical walls 135A, 135B, 135C and 135D extending upwardly from anvil engaging portion 136. Walls 135A and 135B are connected at their proximal and distal ends respectively by walls 135C and 135D.

In use, slotted block portion 139 is securely fixed to anvil portion 130 by means of a set screw 140 which is threadable within threaded guide tube 141 extending within slotted block portion 139 toward slot 139A to securely engage anvil portion 130 therein.

In another embodiment shown in FIG. 2A, the device 201 includes an anvil engaging portion 236, having a slotted block portion 239 with slot 239A for engaging anvil 130 of micrometer 129, with a U-shaped rotational limiting collar track 237 attached to slotted block portion 239, to limit the rotational movement of holder 114 for wires 104 and 107 and holder 113 for wire 110.

While drawing FIG. 1 shows single center wire holder 113 fixed in place against anvil 130 of micrometer 129 and wire holder 114 is rotatable about spindle 119 of micrometer 129, these two wire holders 113 and 114 are interchangeable, so that wire holder 114 may be alternately fixed in place against anvil 130 of micrometer 129 and wire holder 113 may conversely be rotatable about spindle 119.

While one wire holder, either wire holder 113 or 114, is held securely immobile by contact 118 against anvil portion 130 of micrometer 129, the other corresponding oppositely placed wire holder, either 113 or 114, is subject to a spinning movement about rotatable spindle 119 of micrometer 129.

Therefore, recess 135 within rotational limiting collar track 136 is provided to limit rotational movement of wire holder 113 or 114, so that the wire holder 113 or 114 will stay within a general vertical orientation, depending upon which wire holder 113 or 114 is attached to rotating spindle 119 of micrometer 129.

If rotation of spindle 119 causes the wire holder 113 or 114 to start to spin, the spinning motion of wire holder 113 or 114 is interrupted by contact of wire holder 113 or 114 against vertical wall 135A or 135B within recess 135.

To further facilitate the vertical orientation, the weighted portions 119 and 126 of wire holder ears 113 and 114 respectively, are at the bottom of wire holder ears 113 and 114, to insure the vertical orientation in conjunction with the force of gravity upon wire ear holders 113 or 114 disposed to rotatable spindle 119.

Therefore this vertical orientation of wire holder ear 113 or 114 is beneficial for accurate measurement with the wires 104, 107 and 110, since a horizontal orientation of the wires defies gravity and tends to cause an instability of the position of the wires, resulting in inaccurate measurements.

Since the wires 104, 107 and 110 are preferably oriented vertically, the screw 102 is held perpendicular to the wires 104, 107 and 110 in a generally horizontal orientation.

It is noted that center wire 110 and offset wires 104 and 107 may become worn if they are held in place constantly over a period of time. Therefore, in order to accurately measure the pitch diameter of screw threads, the center wire 110 may be moved upward or downward within hole 110A of wire holder portion 113 until a unworn portion of wire 10 is found.

Similarly, offset wires 104 and 107 may be movable vertically within holes 104a and 107a of wire holder 114 to move the worn portion of the wires 104 and 107 away from any screws to be measured.

When the results are tabulated, they are calculated by an optional computer calculator disposed to a further display means. The input data is transferred from the micrometer 129 via a cable to the computer calculator portion, which displays the measuring pitch diameter data on display means or prints it on a printer.

In operation, the holder 114, having wires 104 and 107, is moved by rotational or horizontal movement of spindle 119, to dispose the wire holder 114 in such position that wires 104 and 107 are held generally vertically in place within the tapered flank surface portions 102A, 102B, 102C, 102D, etc. of the screw threads, opposite the vertical wire 110 held in place within wire holder 114.

While the wires 104 and 107 or 110 may not be vertical when they are being moved in place, as soon as they are at the proper position within the screw threads of the screw 102, having pitch diameter being measured, the wires snap into vertical alignment, which is further enhanced by the weighted portions 119 and 126 of wire holders 113 and 114 respectively.

In a further embodiment shown in FIGS. 3-5, wire holder 314 for the measuring wires 304 and 307 may be modified to increase tension upon the spindle of micrometer as shown in FIGS. 3-5. Shown in dotted lines with FIGS. 4 and 5 is an inner cylindrical recessed groove 314A which encircles the bore 314B within wire holders 314 to hold spring clamp 314C about spindle 319 within bore 314B of wire holder 314.

Spring clamp 314C puts tension upon the spindle 319, but is loosely fitted within inner cylindrical recess 314A of wire holder 314. This enables spindle 319 to rotate to advance the holder 314 toward a screw thread being measured, but the loose fitting of the wire holder 314 permits wire holder 314 to maintain a generally vertical position within the confines of a rotational limiting device, such as attachment device 101 or 201. A similar configuration may be made to a wire holder holding a single wire, if such a wire holder is engageable with spindle 319, instead of to the anvil of the micrometer.

Spring clamp 314C, however, does engage spindle 319 to prevent wire holder 314 from accidently falling off and moving longitudinally off of spindle 319.

Moreover, as noted before, the wire holders 113 and 114 are limited in their rotational movement so they will not spin. They do not orient themselves in a horizontal orientation, as shown in the prior art Mahr Gage Company device which provides for holding the wires horizontally in an unstable position.

In contrast, the present invention holds the wires vertically so that the measurement can be accurately made of the pitch of the screw threads being measured.

It can be seen that the vertical orientation of wire holder 113 and 114 allows for accurate measurement of the screw threads of varying diameters.

While the present invention described in connection with the embodiment herein, it should be understood that other embodiments may be made without departing from the spirit in scope of the invention as noted in the appended claims.

I claim:

1. An improved measuring device for utilizing the three wire method of measuring pitch diameter and minor diameter of screw threads the device utilizing a micrometer having an anvil and an advancing spindle within the anvil, comprising:
   a plurality of at least three cylindrical wires, said wires having an outer cylindrical surface capable of contacting a midpoint of a flank of a screw thread between an outer edge and an inner edge of said screw thread,
   a means to hold said wires in vertical orientation during measurement to limit rotation and to position said wires for contact with said threads, said means including a pair of wire holders for engaging said respective three wires, and
   a means to limit a rotational movement of said holders from the application of rotational force against said wire holders for said wires, said means including an anvil engaging attachment engagable to the anvil of the micrometer, said anvil engaging attachment having a slot, the anvil of the micrometer being insertable within said slot, said slot of said anvil engaging attachment closely receiving said anvil, said anvil engaging attachment including a movement limiting means having a recess defined therein, each said wire holder movable within said recess and said recess providing a barrier limiting the movement of each said wire holder to the confines of said recess.

2. The device as in claim 1, wherein said movement limiting means to limit the rotation of said wires further includes
   a generally U-shaped portion, said generally U-shaped portion having said recess therein, said recess defining a restraining portion within which each said wire holder is restrained in rotational movement.

3. The apparatus as in claim 1 wherein said movement limiting means to limit the rotation of said wires further includes
   a collar portion, said collar portion surrounding said recess, said recess defining a restraining portion within which each said wire holder is restrained in rotational movement to position said wires to engage said threads.

4. The device in claim 1, wherein said means to limit the rotational movement of said wires comprises:
   each of said wire holders having a respective weight at a bottom portion of each said wire holder.

5. The device as in claim 1, further comprising said wire holder including a generally extending upper cantilevered portion in spaced relationship away from a generally extending lower cantilevered portion,
   said generally extending upper and lower cantilevered portions extending horizontally away from each said main portion of each said wire holder.

6. The device as in claim 5 further comprising at least one first hole within each said generally extending upper cantilevered portion and at least one second hole within each said generally extending lower cantilevered portion, said at least one first hole in each said generally extending upper cantilevered portion for insertion of at least one screw thread measuring wire of said three cylindrical wires within said at least one first hole and said at least one second hole.

7. The device as in claim 6 wherein said at least one screw thread measuring wire of said three cylindrical wires is movable axially within said at least one first hole and said at least one second hole, said at least one screw thread measuring wire capable of contacting said screw threads along a portion of said at least one screw thread measuring wire.

8. The device as in claim 5 further comprising at least one first groove within each said generally extending upper cantilevered portion and at least one second groove within each generally extending lower cantilevered portion, said at least one first groove in each said generally extending upper cantilevered portion for insertion of at least one screw thread measuring wire of said three cylindrical wires within said at least one first groove and said at least one second groove, each of said at least one screw thread measuring wire of said three cylindrical wires holdable in each of said grooves by a spring clip having an intended pressure point.

9. The device as in claim 8, wherein the pressure point for said spring clip is contiguous with a center line between a pair of screw thread measuring wires.

10. The device as in claim 8, wherein the pressure point is opposite said at least one screw thread measuring wire.

11. The device as in claim 8 wherein said at least one screw thread measuring wire of said three cylindrical wires is movable axially within said at least one first groove and said at least one second groove, said at least one screw thread measuring wire capable of contacting said screw threads along a portion of said at least one screw thread measuring wire.

12. The device as in claim 1, wherein said pair of wire holders comprises a first wire holder and a second wire holder, said first wire holder and said second wire holder being securable in place for permitting said three cylindrical wires to engage said screw threads, said first wire holder of said wire holders securable to a contact of said anvil portion of the micrometer for measuring the pitch diameter of the screw threads,
   said second wire holder of said wire holders engagable with said rotatable spindle of said micrometer, said rotatable spindle responsive to rotational and longitudinal movement,
   said second wire holder responsive to moving at least one of said wires in positional register contact with at least one flank surface of said screw threads, while said second wire holder is in a generally vertical orientation and, at least one of said wires within said second wire holder movable about said spindle within said recess, said recess further defined by at least two generally vertically extending walls, and said generally vertically extending walls limiting movement of said rotational movement of said second wire holder.

13. The device as in claim 1 wherein at least one wire of said three cylindrical wires is advanceable toward at least one of said screw threads by a rotational means, said rotational means being a handle controlling a uniform force applied by said at least one wire against at least one screw thread, said rotational means including a torque control disposed to said handle.

14. The device as in claim 1 further comprising a means for tightening the anvil within said anvil engaging attachment, said means comprising a set screw threadable within a threaded bore within said anvil engaging attachment against the anvil of the micrometer.

* * * * *